July 12, 1932.  J. MARTIN  1,867,226
FRAME LIKE STRUCTURE FOR VEHICLES, AIRCRAFT, AND OTHER CONVEYERS
Filed July 15, 1930
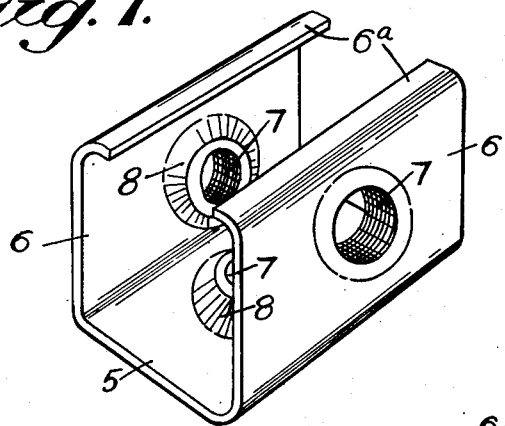
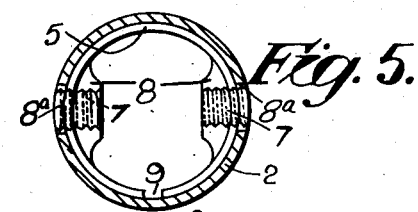
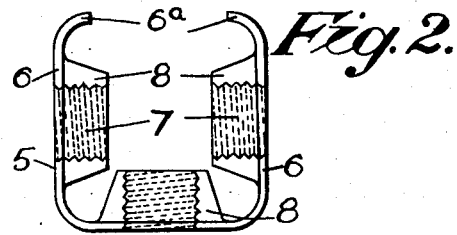
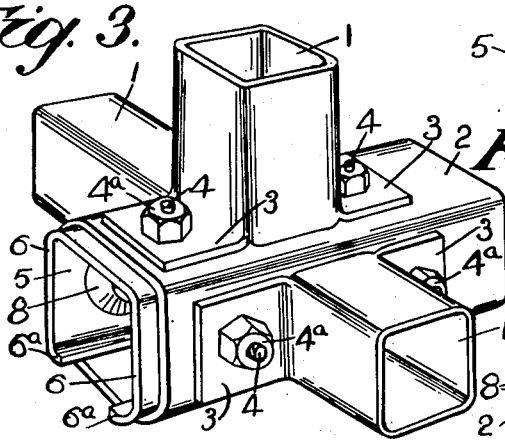
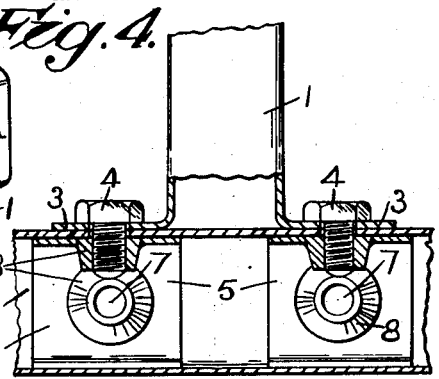
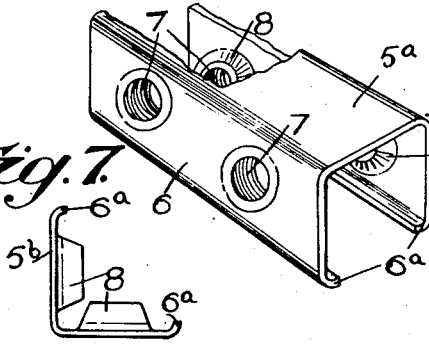
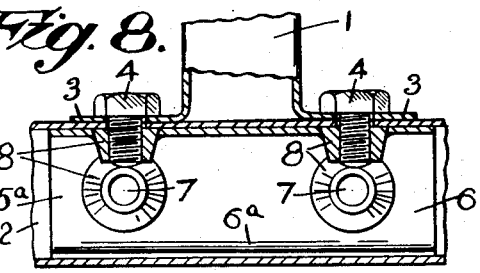
INVENTOR.
JAMES MARTIN.
PER Rayner rho
ATTORNEYS.

Patented July 12, 1932

1,867,226

UNITED STATES PATENT OFFICE

JAMES MARTIN, OF HIGHER DENHAM, ENGLAND

FRAME-LIKE STRUCTURE FOR VEHICLES, AIRCRAFT, AND OTHER CONVEYERS

Application filed July 15, 1930, Serial No. 468,106, and in Great Britain July 16, 1929.

This invention relates to frame-like structures such as body frames for vehicles, aircraft fuselages, and other conveyers for transporting purposes, or aeroplane wings and spars, and has as its objects to facilitate assembly of girders, brackets and like parts, and to reduce the weight of connecting parts without reduction of strength of the connections or of the structure as a whole. A further object of my invention is to reduce to a minimum extraneous projections in assembling frame members, this being very desirable when assembling frame members, spars and struts on aircraft.

Broadly my invention is characterized by a combined abutment and stud or bolt receiving member, the said abutment being of sheet metal and shaped to have a sliding fit along a frame member and being provided with one or more internally threaded lateral or raised parts of increased thickness each adapted to receive a stud or bolt passed through a frame member to be secured to the frame member receiving the combined abutment and stud or bolt receiving member.

In one form of my invention, I provide a member having a shape corresponding to the shape of the girder, bracket arm or other part comprising the frame-like structure, so that it may be slidably mounted either thereon or therein and pushed along to the bolt holes in the girder or the like where it will remain (without requiring to be held by the fingers in such position) while the bolts are placed through said holes and screwed into threaded apertures in said member or into nuts carried thereby.

Said member may be adapted to fit partly or wholly within a girder or the like having a rectangular circular or other cross sectional shape.

I may adapt my invention to structures built up of horizontal and vertical box girders connected by means of angle brackets which are bolted to said girders, for instance as described in my patent application Serial No. 280,084. A short box-like member adapted to fit slidably within the girders is provided with an aperture in one or more of its sides into which a sort of threaded plug or bush is placed, burred over, and brazed on to said member. The latter is then pushed along inside the girder until said threaded plug registers with the appropriate bolt hole in the girder whereupon the bolt will be placed through a hole in the adjacent angle bracket and screwed into said plug.

The box-like member serves merely to position the threaded plugs and therefore may be of light and thin material and comprise but three sides, the ends being bent over, if desired, to form part of the fourth side. The plugs, however, must be stouter, for example hard steel. Instead of making the plugs integral with the box-like member or holder, I may use ordinary nuts and provide said member or holder with a depression or depressions partly or wholly to receive said nuts.

In order that my invention may be clearly understood and readily carried into effect, I have appended hereto a sheet of drawing illustrating embodiments thereof and wherein:—

Fig. 1 is a perspective view showing a suitable form of securing device according to my invention for connecting radially three frame members of tubular section to a common box-section frame member.

Fig. 2 is an end elevation of Fig. 1.

Fig. 3 is a perspective view showing the device illustrated in Figs. 1 and 2 applied to the attachment of three struts or frame members bolted to a common box-section central frame member.

Fig. 4 is a longitudinal section through a joint similar to that shown in Fig. 3.

Figs. 5 and 6 are sectional end elevation views showing the invention applied to circular and oval section frame members respectively.

Fig. 7 is a broken perspective view showing a securing device adapted to receive two bolts in each side limb.

Fig. 8 is a longitudinal section view showing the device in Fig. 7 put into practice.

Fig. 9 is an end elevation view showing a bolt receiving member of L section.

Referring to the drawing, in Fig. 3 will be seen one form of my invention in which a number of struts or frame members 1 are firmly secured to a main frame member 2 so that they radiate rigidly therefrom. This construction is useful in chassis work and also in aeroplane body work. For instance the member 2 may be a main longitudinal fuselage member and the members 1 can be transverse and vertical frame members or the assembled structure can constitute a corner bracket in which the members 1 are short and are adapted to receive struts or the like. The construction shown in Fig. 3 is a fair example of the type of work contemplated by my invention, and in the preferred form of my invention as shown the method of securing the struts 1 to the main member 2 is such that extraneous brackets are unnecessary, the members 1 being formed with flanges, lugs or laterally bent plates 3 adapted to reside flush against the member 2, these projections 3 being suitably apertured to receive studs or bolts 4 which are firmly held in position by an improved form of nut device which constitutes the main feature of my invention.

The example of stud or nut receiving device employed with the construction shown in Fig. 3 is more clearly shown in Figs. 1 and 2 in which a U section steel or other suitable metal plate 5 has cross sectional dimensions which enable it to be slid as a close fit along the box section tubular main member 2, the parallel sides 6 of this member 5 preferably being springy so that they press against the opposing sides of the interior of the member 2. The upper ends of the limbs 6 are preferably curved inwards as shown at 6a to avoid sharp edges and to facilitate the sliding of each member 5 into the main member 2. With the device shown in Fig. 3, a pair of members 5 are provided for securing the members 1 to the main member 2, the members 5 preferably being abutted end to end and each being formed with a number of threaded apertures 7 corresponding in location to the bolts or studs 4 arranged one side of the members 1.

The threaded apertures 7 are formed in plugs or bosses 8 these members 8 preferably fitting closely in apertures in the member 5, and brought flush with the outer faces of the member 5 and welded or otherwise suitably secured in position. Alternately a reduced shank may be formed on the boss 8 and passed through the hole and riveted over or otherwise secured. The heads of the members 8 can be of truncated conical form as shown and the axial depth of each hole 7 corresponds to approximately the corresponding depth of a nut appropriate to the reception of one of the bolts 4. If desired, nuts may actually be fitted in the holes in the fittings 5 and can be welded or otherwise secured in position. A suitable method of securing such nuts in position may consist of bending tongues from the member 5 to press against the faces of the nuts and to overhang the upper sides of the nuts.

When affixing one or more members 1 to a main member 2 a pair of the bolt receiving members 5 are pushed along the tube 2 until the holes 7 register with the bolt or stud holes in the member 2, and the bolts or studs are passed through the lateral projections 3 of the members 1 and threaded into the nut like parts 8 of the member 5.

If desired instead of a pair of members 5 for securing a set of struts or the like 1 to a main tubular member, two sets of nut like parts 8 can be formed on one channel section member 5a as shown in Figs. 7 and 8, this method being suitable where great accuracy in construction can be depended upon and the maximum rigidity is required.

It will be appreciated that the cross section of the members 5 and 5a depends upon the section of the main member 2 and also the number and location of bolts or studs 4. For instance, in Fig. 9, where only two sets of members 1 are to be secured at right angles to each other to a main member 2, it is only necessary to employ an L section metal plate 5b instead of a U section one. Of course it will be understod that instead of the U section members, quadrilateral section, triangular section or any other suitable section may be employed.

When the main member 2 is bounded by curved sides, for instance of circular section as shown at 2a in Fig. 5, or of oval section as shown at 2b the member 5 can be of corresponding section and can be split longitudinally as indicated at 9 so that it has a tendency to spring against the sides of the member 2a. By such an arrangement, the nut like portions 8 can be formed with outwardly drected tongue like parts 8a which can spring into the apertures 7 of the member 2a or 2b. This provides an automatic locking and location of the slidable members 5 and it will be appreciated that in the embodiment shown in the other figures one or more faces of each member 5, 5a or 5b can be formed with corresponding projections adapted to spring into the appropriate hole or holes 7. Alternatively or in addition, each member 5 or its equivalent can be formed with a tongue pressed out from it, or a pin projecting from it, adapted to trip into a hole punched in the member 2 or its equivalent when the member 5 is correctly located.

It will be appreciated that the faces of the member 5, 5a or 5b constitute abutments which bear over a fairly large area against the member 2 or its equivalent, the result being equivalent to or more efficient than employing nuts of large diameter with each bolt or stud, thereby obtaining great strength and rigidity with lightness in construction.

I claim:—

1. In means for connecting to each other a pair of tubular section frame members so that one abuts transversely across an end of the other, a third tubular member split longitudinaly so as to expand outwards fitted into the transversely abutting tubular member, integral lateral lugs on the abutting end of the other tubular member and inwardly directed bosses on the internally fitted tubular member receiving studs passed through said lugs.

2. In means for connecting to each other a pair of tubular section frame members so that one abuts transversely across an end of the other, a third member of substantially L section fitted closely into the transversely abutting tubular member, integral lateral lugs on the abutting end of the other tubular member and inwardly directed bosses on the internally fitted L section member receiving studs passed through said lugs.

JAMES MARTIN.